(12) United States Patent
Brombach et al.

(10) Patent No.: US 11,286,905 B2
(45) Date of Patent: Mar. 29, 2022

(54) METHOD FOR REBUILDING AN ELECTRIC SUPPLY GRID

(71) Applicant: Wobben Properties GmbH, Aurich (DE)

(72) Inventors: Johannes Brombach, Berlin (DE); Ingo Mackensen, Aurich (DE); Kai Busker, Großefehn (DE)

(73) Assignee: Wobben Properties GmbH, Aurich (DE)

( * ) Notice: Subject to any disclaimer, the term of this patent is extended or adjusted under 35 U.S.C. 154(b) by 55 days.

(21) Appl. No.: 16/465,437

(22) PCT Filed: Dec. 1, 2017

(86) PCT No.: PCT/EP2017/081104
§ 371 (c)(1),
(2) Date: May 30, 2019

(87) PCT Pub. No.: WO2018/100125
PCT Pub. Date: Jun. 7, 2018

(65) Prior Publication Data
US 2020/0003181 A1    Jan. 2, 2020

(30) Foreign Application Priority Data

Dec. 2, 2016   (DE) .................... 10 2016 123 384.6

(51) Int. Cl.
*F03D 7/02* (2006.01)
*F03D 7/04* (2006.01)
(Continued)

(52) U.S. Cl.
CPC ......... *F03D 7/0284* (2013.01); *F03D 7/0264* (2013.01); *F03D 7/048* (2013.01);
(Continued)

(58) Field of Classification Search
None
See application file for complete search history.

(56) References Cited

U.S. PATENT DOCUMENTS 6,724,097 B1 * 4/2004 Wobben ............... F03D 9/255
290/44
7,528,496 B2   5/2009 Fortmann
(Continued)

FOREIGN PATENT DOCUMENTS

EP   1993184 A1   11/2008
EP   1665494 B1   5/2012
(Continued)

*Primary Examiner* — Mohammad Ali
*Assistant Examiner* — David Earl Ogg
(74) *Attorney, Agent, or Firm* — Seed IP Law Group LLP

(57) ABSTRACT

A method for rebuilding an electric supply grid of a grid operator by means of at least one wind power installation, wherein the electric supply grid has a first grid section and at least one further grid section, wherein the first grid section is connected to the at least one wind power installation and has a first grid nominal voltage, the first grid section is coupled to the at least one further grid section via at least one switching device in order to transmit electric energy between the grid sections, wherein the at least one switching device is set up to disconnect the first grid section from the at least one further grid section in the event of a fault, comprising the steps of operating the at least one wind power installation in an observation mode if the fault occurs, wherein the wind power installation does not feed the first grid section in the observation road and a status of the first grid section is checked, and operating the at least one wind power installation in a grid rebuilding mode if the first grid section has a grid rebuilding voltage, and operating the at least one wind power installation in a normal operating mode again as soon as the fault has passed.

21 Claims, 4 Drawing Sheets

(51) Int. Cl.
*H02J 3/18* (2006.01)
*H02J 3/38* (2006.01)
*H02J 3/00* (2006.01)

(52) U.S. Cl.
CPC ............... *H02J 3/18* (2013.01); *H02J 3/386* (2013.01); *F05B 2270/107* (2013.01); *H02J 3/001* (2020.01); *H02J 3/388* (2020.01)

(56) References Cited

U.S. PATENT DOCUMENTS

| | | | |
|---|---|---|---|
| 8,000,840 B2 | 8/2011 | Nielsen | |
| 8,335,594 B2* | 12/2012 | Altemark | F03D 7/048 700/287 |
| 9,742,191 B2 | 8/2017 | Beekmann | |
| 9,920,746 B2 | 3/2018 | Diedrichs et al. | |
| 2008/0195255 A1* | 8/2008 | Lutze | F03D 9/257 700/291 |
| 2013/0046492 A1* | 2/2013 | Westergaard | H02J 3/004 702/60 |
| 2015/0137520 A1* | 5/2015 | Garcia | H02P 9/102 290/44 |
| 2015/0260159 A1* | 9/2015 | Jimenez Buendia | F03D 7/0284 290/44 |
| 2016/0248254 A1* | 8/2016 | Huomo | G01R 19/2513 |
| 2018/0083446 A1* | 3/2018 | Kern | H02J 7/007 |

FOREIGN PATENT DOCUMENTS

| | | |
|---|---|---|
| JP | 2007037224 A | 2/2007 |
| JP | 2008271709 A | 11/2008 |
| JP | 2016100981 A | 5/2016 |
| JP | 2016167917 A | 9/2016 |
| RU | 2597235 C2 | 9/2016 |
| WO | 2014/009223 A2 | 1/2014 |

* cited by examiner

METHOD FOR REBUILDING AN ELECTRIC SUPPLY GRID

BACKGROUND

Technical Field

The present invention relates to a method for rebuilding an electric supply grid by at least one wind power installation. The present invention also relates to a wind power installation and to a wind farm.

Description of the Related Art

The operation of an electric supply grid, for example the European interconnected grid, is generally known.

Very generally, the electric supply grids in this case have a plurality of grid sections with a grid nominal voltage and a grid nominal frequency which are connected to one another via switching devices.

In this case, the grid sections are arranged both horizontally, that is to say with an identical grid nominal voltage, and vertically, that is to say with a different grid nominal voltage, with respect to one another and are connected to one another via switching devices and possibly transformer stations.

In this case, the switching devices are provided for the purpose of protecting the electric supply grid. In particular, proper (further) operation of the other or further grid sections is intended to be ensured by disconnecting grid sections which have a grid fault, that is to say so-called faulty grid sections.

Various grid faults or disruptions, for example as a result of a plurality of power plants failing in a grid section, may result in the voltage of the electric supply grid, in particular the grid voltage of the faulty grid section, dipping or failing or disappearing.

The grid section affected by this disruption therefore has substantially a grid voltage which is insufficient for proper operation of the corresponding grid section. The corresponding grid section is then usually switched to be voltage-free by means of the switching devices, that is to say is separated from the electric supply grid and is disconnected from other grid sections coupled to this grid section. This is colloquially also referred to as a power failure.

In the case of a major disruption, a plurality of grid sections may also no longer have a grid voltage or the electric supply grid may have a blackout, as happened in Italy in 2003 or in the USA in 2011, for example.

For such a situation, the grid operator of the electric supply grid or of the faulty grid section usually provides for the grid voltage to be rebuilt and stabilized, after the fault has been cleared, by means of large conventional power plants before the corresponding grid section or the electric supply grid is operated properly again. In particular, the grid operator provides for the conventional power plants to rebuild and stabilize the grid voltage in the affected grid section in the event of a voltage failure. This operation is also referred to as grid rebuilding.

In this case, the grid voltage of the faulty or voltage-free grid section can be fundamentally rebuilt by means of power plants which are capable of a black start or by means of a further grid section which is adjacent via switching devices.

A grid rebuilding voltage which is usually unstable and is below the grid nominal voltage of the grid section is provided in this manner for the faulty grid section. Although the faulty grid section again has a grid voltage as a result, it cannot yet be operated properly.

Further consumers and conventional power plants are now gradually connected according to a schedule of the grid operator until the grid section can be operated properly again.

Only now can further consumers and producers be connected properly to the grid section again and can be operated properly again.

In view of the fact that regenerative producers are becoming more and more important, it may be critical for rebuilding the grid that, in the event of voltage failures or blackouts, the corresponding grid voltage of the grid section affected by the voltage failure is stabilized by means of a multiplicity of conventional power plants without taking into account the large number of regenerative producers.

In the priority application for the present application, the German Patent and Trademark Office researched the following prior art: EP 1 993 184 A1 and EP 1 665 494 B1.

BRIEF SUMMARY

Provided is a method which makes it possible to support a grid voltage of a grid section of an electric supply grid during rebuilding of the electric supply grid without the extensive and/or exclusive use of conventional power plants.

Provided is a method for rebuilding an electric supply grid of a grid operator by means of at least one wind power installation. Accordingly, the wind power installation is connected to a first grid section, wherein the first grid section has a grid nominal voltage and is coupled to a further grid section via at least one switching device, wherein the switching device is set up to disconnect the first grid section from the at least one further grid section in the event of a fault.

A fault should be understood as meaning, in particular, a voltage failure of the grid voltage of the first grid section that has been caused, for example, by a short circuit in the first grid section. In the event of a voltage failure, the affected grid section usually no longer has a grid voltage. However, a fault is also understood as meaning a voltage dip which has likewise been caused, for example, by a short circuit in the first grid section. In the event of a voltage dip, although the affected grid section has a grid voltage, the latter is so unstable and/or so low that the grid section cannot be operated properly.

If a fault occurs or has been detected, the wind power installation is operated in an observation mode. The at least one wind power installation therefore changes from a normal operating mode to the observation mode. In the observation mode, the at least one wind power installation does not feed any electric power into the first grid section, but checks a status of the grid section, in particular with respect to whether the grid section has a grid rebuilding voltage.

The status of the first grid section can be checked, for example, by means of voltage capture or can be requested from the grid operator. The voltage capture itself can be carried out by measuring the grid voltage of the first grid section, in particular by means of the at least one wind power installation or by means of a farm controller of the corresponding wind farm.

In the observation mode, the at least one wind power installation therefore does not feed any electric power into the first grid section and at the same time monitors the status of the first grid section. The grid voltage is also preferably captured in the observation mode in order to determine whether there is a grid rebuilding voltage in the first grid section, that is to say, in particular, whether the first grid section has a grid voltage again or a quasi-stable voltage. In this case, the grid voltage can be captured by the at least one wind power installation, for example by means of a voltage measuring device. In this case, the grid rebuilding voltage is, in particular, a stable grid voltage having an absolute value which is within a tolerance band of the grid nominal voltage. The tolerance band may be, for example, 10% of the grid nominal voltage, with the result that the corresponding voltage reaches from 90% to 110% of the grid nominal voltage. Such a voltage is then considered to be stable. A grid rebuilding voltage is therefore present if the grid voltage is stable within the tolerance band, in particular over several minutes, for example more than 10 minutes.

In the observation mode, the at least one wind power installation preferably also generates as much electric energy as it requires for its personal needs. This can be achieved, for example, by operating the at least one wind power installation in a severely throttled manner, for example with 1% of the nominal power of the wind power installation. This electric energy generated during throttled operation is then used, for example, to operate the beaconing devices of the at least one wind power installation and/or to operate the heating systems of the at least one wind power installation and/or to supply a communication device for the grid operator and/or to adjust the azimuth angle of the nacelle of the at least one wind power installation, in particular in order to rotate the at least one wind power installation into the wind or orient it in the wind. The observation mode of the at least one wind power installation therefore preferably comprises a personal needs mode, which can also be referred to as a self-sustaining mode, in which the at least one wind power installation supplies itself with electric energy.

If it is now determined in the observation mode that a grid rebuilding voltage is present, in particular a grid voltage which can be used to rebuild the first grid section by means of at least one wind power installation, the wind power installation is operated in a grid rebuilding mode or changes to this mode. It is therefore proposed that the at least one wind power installation changes its operating mode, preferably from the observation mode to a or the grid rebuilding mode if the first grid section has a grid rebuilding voltage, in particular in order to support the grid voltage.

In the grid rebuilding mode, the wind power installation then preferably has a control process on the basis of a desired voltage. The wind power installation accordingly varies its reactive power which is fed in during grid rebuilding in such a manner that the grid voltage is kept as stable as possible. The wind power installation therefore feeds substantially as much electric reactive power into the first grid section as is needed to keep the grid voltage stable, in particular to keep the grid voltage in a tolerance band which, in one embodiment, is 90 to 110% of the grid nominal voltage. In this case, the wind power installation preferably captures the grid voltage of the first grid section in the grid rebuilding mode. In one particularly preferred embodiment, the electric active power which is fed in by the at least one wind power installation is also controlled by means of a desired active power value which is specified by the grid operator. Accordingly, the electric reactive power is set on the basis of a desired voltage and the electric active power is tracked to a desired active power value specified by the grid operator.

If the fault has now passed, the wind power installation is still operated in a normal operating mode or is operated in the normal operating mode again. This is preferably carried out in response to a grid operation signal which indicates that the fault has passed. In the normal operating mode, the wind power installation then feeds in electric active and reactive power again, in particular on the basis of a prevailing wind and/or a grid frequency of the first grid section.

The fault is preferably a voltage drop in the first grid section and/or an overfrequency in the first grid section and/or an underfrequency in the first grid section.

The fault therefore occurs in the grid section to which the at least one wind power installation is connected.

The fault is also a voltage drop, in particular a voltage dip, in the case of which the grid voltage undershoots at least one voltage value which is substantially less than the grid nominal voltage, for example less than 90% of the grid nominal voltage. Depending on the structure of the grid section or of the electric supply grid, this voltage value may also be less than 90% of the grid nominal voltage.

However, the fault may also be an overfrequency or an underfrequency. An overfrequency is present, for example, if the grid frequency exceeds 52.5 Hz and the grid nominal frequency is 50 Hz. An underfrequency is present, for example, if the grid frequency undershoots 47.5 Hz and the grid nominal frequency is 50 Hz. The fault can therefore also be captured by means of the grid frequency. When capturing the grid frequency for the purpose of determining a fault, it is particularly advantageous that the grid frequency can indicate the fault before the grid frequency has dipped. In one particularly preferred embodiment, a fault is present if both the grid voltage is below 90% of the grid nominal voltage and the grid frequency is outside a frequency range which is defined from 47.5 Hz to 52.5 Hz.

The fault is preferably determined by means of a message from the grid operator and/or by capturing a grid voltage of the first grid section, wherein the grid voltage captured in this manner is less than 90% of the grid nominal voltage.

In the case of this suggestion, the fault is therefore determined by the grid operator, in particular by measuring the grid voltage, preferably in the first grid section. The grid voltage captured in this manner is then transmitted to the at least one wind power installation. Additionally or alternatively, the fault is determined by means of capture, in particular by the at least one wind power installation itself or by a control unit of a wind farm having the at least one wind power installation. The fault is particularly preferably reported to the at least one wind power installation by the grid operator and the wind power installation itself then checks whether a fault is actually present, for example by measuring the grid voltage of the first grid section. A fault is present only if the measured grid voltage is also outside a tolerance band around the grid nominal voltage. The measured grid voltage is preferably less than 90% of the grid nominal voltage.

It is preferably detected that the fault has passed by means of a message from the grid operator and/or by capturing a grid voltage of the first grid section, wherein the grid voltage captured in this manner is greater than 70%, preferably greater than 90%, of the grid nominal voltage, if it was previously below it. In particular, it is proposed that the grid voltage is above the respective value at least for a predetermined minimum period.

Additionally or alternatively, the end of the fault can be captured by capturing a frequency stability, wherein a frequency stability is present if the grid frequency is within a tolerance band for a predetermined period, wherein the tolerance band has an upper limit and a lower limit, in particular wherein the upper limit is above the grid nominal frequency and the lower limit is below the grid nominal frequency, in particular wherein the upper limit is 51 Hz and the lower limit is 49 Hz and the grid nominal frequency is 50 Hz, and/or by means of a grid detection unit which is set up to vary the reactive power which is fed in and to observe the first grid section in order to the The fault is therefore present until the grid operator reports that the fault has passed. The fault is therefore defined, in particular, from a message from the grid operator stating that there is a fault until a message from the grid operator stating that this fault has passed. The reported fault can therefore be present for considerably longer than the actual physical fault in the electric supply grid. In this case, it is particularly advantageous that the grid operator, often with considerably better knowledge of the electric supply grid, can decide when it is useful for the at least one wind power installation to change to the normal operating mode again.

Alternatively, the fault has passed when a grid voltage of the first grid section which is greater than 70% of the grid nominal voltage is captured. The capture can be carried out both by the grid operator and by the wind power installation or by a control unit of a wind farm having the at least one wind power installation. In this case, the capture can be carried out by measuring the grid voltage of the first grid section.

The fault has particularly preferably passed when the grid operator reports this to the at least one wind power installation and the wind power installation then itself checks whether the grid voltage is greater than 90% of the grid nominal voltage. The fault has therefore passed only when the grid operator reports this and the grid voltage is also actually greater than 90% of the grid nominal voltage.

One variant proposes a grid detection unit which is set up to excite the grid and to observe a first grid section in order to determine the size of the first grid section, preferably in order to determine the statics of the first grid section. The fact that the fault has passed can therefore also be determined by capturing a stable frequency and/or by estimating the size of the first grid section, for example using the impedance of the first grid section, and/or by estimating the statics of the grid. This can be carried out, for example, by varying the reactive power which is fed in and then observing the grid frequency and/or the grid voltage. If the reactive power is increased briefly and the voltage or frequency changes greatly, the first grid section is small and has not yet been fully rebuilt. In contrast, if the response to the variation in the reactive power which is fed in to the first grid section is small, it can be assumed that the fault has passed.

The grid rebuilding mode preferably comprises synchronization operation in which the wind power installation is synchronized with the grid voltage of the first grid section, preferably when the grid voltage is substantially stable.

The grid rebuilding mode of the at least one wind power installation therefore also comprises synchronization operation. During synchronization operation, the wind power installation checks, in particular, whether the synchronization conditions for connecting to the first grid section, which has a grid rebuilding voltage, are satisfied, namely whether the terminal voltage of the wind power installation and the grid rebuilding voltage correspond with respect to their frequency and absolute values and have the same phase angle. If the at least one wind power installation forms a wind farm, synchronization operation is carried out by a wind farm controller which controls the wind power installations in the wind farm in such a manner that the wind farm terminal voltage is in sync with the grid rebuilding voltage. In one particularly preferred embodiment, the synchronization or synchronization operation is first carried out, preferably only carried out, when the grid voltage is substantially stable, that is to say is suitable for rebuilding the grid.

The grid rebuilding mode comprises a power control process during which the wind power installation feeds an electric power into the first grid section on the basis of a desired power value, wherein a desired power value is preferably specified by the grid operator, and/or increases the electric power in such a manner that it is slowly tracked in the case of a remaining system deviation, in particular using an I-controller.

Grid rebuilding therefore comprises, preferably for synchronization operation, a power control process which is used to control the electric power, in particular the electric active power, of the at least one wind power installation. In this case, the control is carried out on the basis of a desired power value which specifies how much electric power is intended to be fed into the first grid section by the at least one wind power installation. This desired power value is preferably specified by the grid operator, for example by means of a ramp function. In this case, the specification by the grid operator can be stored in the controller of the wind power installation or can be directly transmitted by the grid operator. The wind power installation therefore has a controller which comprises a power control process which can be implemented both as hardware and as software and is set up to receive desired power values from the grid operator and/or to store desired power values from the grid operator for rebuilding the grid. In one particularly preferred embodiment, the electric active power is controlled independently of the control of the electric reactive power.

Additionally or alternatively, the electric power is tracked to a deviation of the grid frequency from the grid nominal frequency in such a manner that the deviation is minimized. The electric power is therefore controlled, for example via an I-controller, in such a manner that it counteracts a frequency deviation of the grid frequency from the grid nominal frequency.

The power control process preferably has a frequency stabilization process which retains some of the electric power in order to release it, in particular feed it in, if necessary for stabilizing the frequency of the first grid section and/or limits feeding-in of electric power if the first grid section has a grid frequency which is an overfrequency.

The power control process is therefore designed in such a manner that it deliberately retains some of the electric power in order to use it for frequency stabilization, that is to say to thus possibly support the frequency of the voltage of the electric supply grid. For example, the power control process has an active power ramp with a slope which specifies the electric active power to be fed in. If the ramp now has a desired active power value which is greater than the potential actual power of the wind power installation, for example because there is too little wind, the active power ramp is corrected downward and, in particular, the slope of the ramp is reduced, to be precise in such a manner that the new desired active power value is smaller than the potential actual power of the wind power installation. The difference between the desired active power value and the potential actual power then forms the electric power which is deliberately retained in order to release it if necessary for stabilizing the frequency of the first grid section or to offer it to the grid operator and to accordingly feed it in when requested by the grid operator. The feeding-in by the at least one wind power installation is therefore throttled by the frequency stabilization in order to retain some if needed.

It is particularly advantageous in this case that the at least one wind power installation is set up, by carrying out the method, to additionally provide a controlling power which can be used to keep the frequency of the first grid section stable and/or to stabilize the frequency of the electric supply grid. In addition, the wind power installation can provide this controlling power in a particularly fast manner.

Additionally or alternatively, the power control process has a limiter which limits the power fed in by the at least one wind power installation if the first grid section has an overfrequency. An overfrequency is present, for example, if the first grid section has a grid nominal frequency of 50 Hz and the grid frequency is above 52.5 Hz or a grid frequency which is greater than 52.5 Hz is captured.

The wind power installation is preferably operated in such a manner that it retains a predetermined portion, in particular at least 5%, in particular at least 10%, of its nominal power as controlling power and/or feeds it in if necessary in order to minimize frequency fluctuations which occur in the first grid section and/or makes it available, in particular reports it, to the grid operator for further control measures.

The wind power installation is therefore operated, in particular during the grid rebuilding mode, in such a manner that it retains at least 5% of its nominal power as controlling power and feeds it in only if necessary in order to combat frequency fluctuations which occur in the first grid section. In one particularly preferred embodiment, the wind power installation is operated irrespective of the state of the first grid section in such a manner that it retains at least 5% of its nominal power as controlling power.

Additionally or alternatively, the wind power installation is controlled on the basis of a frequency deviation. The wind power installation therefore feeds an electric active power into the first grid section, which power is set on the basis of a deviation of the grid frequency from a predetermined desired frequency, for example by means of a P-controller. In one particularly preferred embodiment, the wind power installation also has an I-controller which is set up to track, preferably to slowly track, the active power which is fed in to the frequency deviation in such a manner that the deviation of the grid frequency from the grid nominal frequency is minimized or adjusted.

A weather forecast is preferably captured for the grid rebuilding mode, in particular for the purpose of determining a guaranteed minimum power of the at least one wind power installation, wherein the weather forecast is determined by the at least one wind power installation itself, and/or is requested by the at least one wind power installation, in particular from the grid operator.

The grid rebuilding mode therefore has a weather forecast, preferably for synchronization operation and the power control process. The weather forecast is preferably at least suitable for predicting the prevailing wind conditions for the at least one wind power installation for at least the next two, preferably four, hours. In this case, the prevailing wind conditions particularly preferably comprise at least a wind speed and a wind direction.

The wind speed is preferably an average wind speed which is standardized to sea level. A correction factor is used to then convert this average wind speed to the hub height of the corresponding wind power installation in order to calculate the yield of the wind power installation. The average wind speed is particularly preferably a wind speed which is averaged over an interval of time of 15 minutes.

A guaranteed minimum power of the at least one wind power installation is determined by means of the weather forecast and, in particular, taking into account geographical data relating to the location of the at least one wind power installation, for example onshore or offshore. In this case, the weather forecast itself may be carried out by the at least one wind power installation itself or the grid operator, wherein the grid operator then preferably transmits the weather forecast to the at least one wind power installation. The guaranteed minimum power is then determined by the at least one wind power installation or its operator.

A guaranteed minimum power of the at least one wind power installation is preferably determined, in particular on the basis of a or the weather forecast.

Grid rebuilding therefore also comprises the determination of a guaranteed minimum power which is determined, in particular, on the basis of a weather forecast. A guaranteed minimum power is a power which can be provided by the wind power installation in a predetermined or requested period, wherein this value is also known and can therefore be guaranteed or is assured with at least a probability of 3σ, preferably 5σ. The guaranteed minimum power is therefore assured or fault-free at least with a probability of 93.3%, preferably is assured or fault-free with at least a probability of 99.77%. It is checked here, in particular, on the basis of a weather forecast, how much wind power is at least available. Fluctuation ranges of the weather forecast are therefore concomitantly taken into consideration and the power which can be provided in any case is then fundamentally taken. The grid is therefore rebuilt on the basis of the guaranteed minimum power. In particular, the controllers of the wind power installation are accordingly parameterized on the basis of the guaranteed minimum power. For example, a guaranteed minimum power of 2 MW for the next four hours is determined on the basis of a weather forecast, wherein the wind power installation itself has a nominal power of 4 MW. The controller, in particular the power control process, is then adjusted in such a manner that the maximum desired value is 2 MW. This can be carried out, for example, by changing the power ramps or limiting or parameterizing a limiter.

A value or another item of information for a guaranteed minimum power of the at least one wind power installation is preferably transferred to the grid operator on the basis of a or the weather forecast.

In this case, a value for the guaranteed minimum power or an item of information relating to the guaranteed minimum power, which was determined on the basis of a weather forecast, is transferred to the grid operator, for example by the at least one wind power installation itself or by the operator of the at least one wind power installation. The grid operator can therefore concomitantly take into account the at least one wind power installation or the power stated by it as a guaranteed power as a fixed variable for rebuilding the grid.

In this case, it is particularly advantageous that, in the situation of rebuilding the grid, the grid operator can therefore also determine an available power for the corresponding grid section with a very high degree of accuracy and can choose a corresponding schedule for rebuilding the grid according to this available power. Such a procedure also makes it possible for the grid operator to specify, to the at least one wind power installation, targeted, and in particular optimized, desired values, in particular desired active and reactive power values in the form of active and reactive power ramps for rebuilding the grid.

The first grid section is preferably provided with a voltage synchronized with the grid voltage by means of the at least one wind power installation, in particular on the basis of a or the weather forecast and/or on the basis of a desired voltage specification of the grid operator, wherein the desired voltage specification has been determined on the basis of a weather forecast, in particular has been determined by the grid operator.

The at least one wind power installation and the wind farm therefore provide a terminal voltage which is synchronized with the grid voltage and is substantially the same as the grid voltage with regard to the frequency, the absolute value and the phase angle. This voltage is preferably set on the basis of a desired voltage specification by the grid operator, wherein the desired voltage specification specifies, in particular, the absolute value of the desired voltage value on the basis of a weather forecast. For example, the weather forecast states that the prevailing wind conditions in the coming hours are sufficient for the at least one wind power installation to be able to be operated with nominal power. The desired voltage specification then has a desired voltage value which is above the grid nominal voltage, for example is 105% of the grid nominal voltage. If the weather forecast states that the prevailing wind conditions suffice only for 50% of the nominal power of the at least one wind power installation, the desired voltage specification has, for example, a desired voltage value which is below the grid nominal voltage, for example 95% of the grid nominal voltage. The wind power installation then feeds in a reactive power corresponding to the desired voltage value of the desired voltage specification, in particular in order to support the grid voltage of the first grid section. The wind power installation therefore has weather-dependent reactive current feeding, preferably on the basis of a wind speed and a wind direction, predicted for at least 10 minutes, preferably for at least 30 minutes, particularly preferably for at least 2 hours.

The first grid section is preferably provided with the voltage using a voltage stabilization process which is performed on the basis of a or the desired voltage specification in order to provide the first grid section with a substantially stable voltage. In particular, the voltage stabilization process is performed by feeding in reactive power.

The wind power installation therefore has at least reactive power feeding which is set up to keep the grid voltage stable on the basis of a desired voltage specification, in particular to keep the grid voltage in a tolerance band of 10% of the grid nominal voltage, with the result that the grid voltage is in a range of 90% to 110% of the grid nominal voltage. The reactive power feeding is therefore formed at least from a controller, the input variable of which is the captured grid voltage and the output variable of which is a desired reactive power value. In one particularly preferred embodiment, the desired reactive power value is set in this case on the basis of a weather forecast.

Provided is a method for rebuilding an electric supply grid by means of a wind farm comprising a plurality of wind power installations which are set up to carry out a method described above or below, wherein the wind farm has at least a nominal power of between 4 MW and 400 MW and is coupled to the first grid section.

It is therefore proposed to carry out the method described above or below using a plurality of wind power installations which form a wind farm. In this case, a wind farm is a functional combination of a plurality of wind power installations which are connected to the electric supply grid, in particular via a common grid connection point.

It is particularly advantageous in this case that the grid operator must communicate only with a wind farm controller for the purpose of rebuilding the electric supply grid, instead of communicating with a multiplicity of wind power installations.

The at least one wind power installation preferably has a transformer having a primary side and a secondary side which is set up to connect the at least one wind power installation to a or the first grid section, wherein this grid section has a grid nominal voltage of between 10 kV and 400 kV.

The grid section, to which the wind farm is connected, therefore has a grid nominal voltage of between 10 kV and 400 kV. The grid section is connected to the secondary side of the transformer and, as a result, the wind power installation is set up to provide the grid section with a corresponding voltage.

Provided is a wind power installation comprising a control unit for controlling the wind power installation, wherein the wind power installation is controlled by means of the control unit to carry out a method described above or below.

The wind power installation therefore has at least one control unit which is set up to control the active power to be fed in and the reactive power to be fed in by means of a first operating mode, in particular a normal operating mode, a second operating mode, in particular an observation mode, and a third operating mode, in particular a grid rebuilding mode. In this case, the controller is preferably set up to control the wind power installation at least occasionally on the basis of a weather forecast. The control unit preferably also comprises a communication device which is set up to interchange data with the grid operator for the purpose of rebuilding the grid. Such a communication device is preferably set up to carry out or set up wireless communication.

BRIEF DESCRIPTION OF THE SEVERAL VIEWS OF THE DRAWINGS

The present invention is now explained in more detail below, by way of example, on the basis of exemplary embodiments with reference to the accompanying figures.

DETAILED DESCRIPTION

Figure 1:
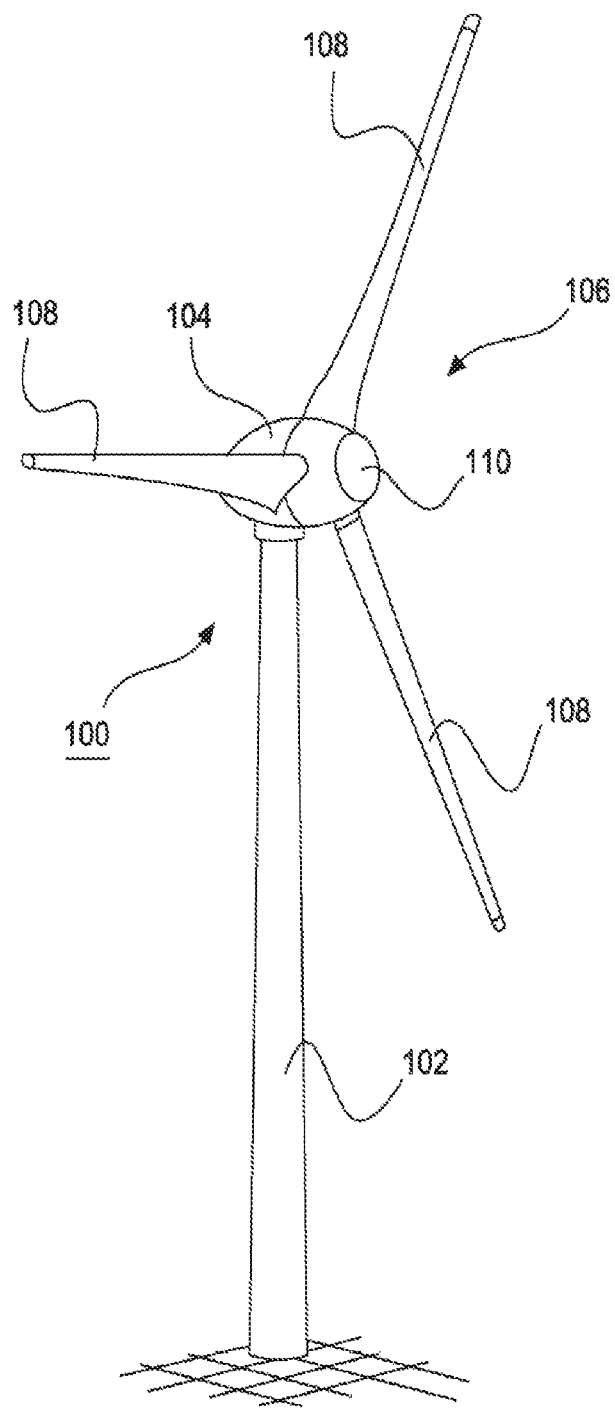
FIG. 1 schematically shows a perspective view of a wind power installation.

FIG. 1 shows a wind power installation 100 which is set up, by means of a control unit, to carry out a method for rebuilding an electric supply grid. The wind power installation has a tower 102 and a nacelle 104. A rotor 106 having three rotor blades 108 and a spinner 110 is arranged on the nacelle 104. The rotor 106 is caused to rotate by the wind during operation and thereby drives a generator in the nacelle 104.

Figure 2:
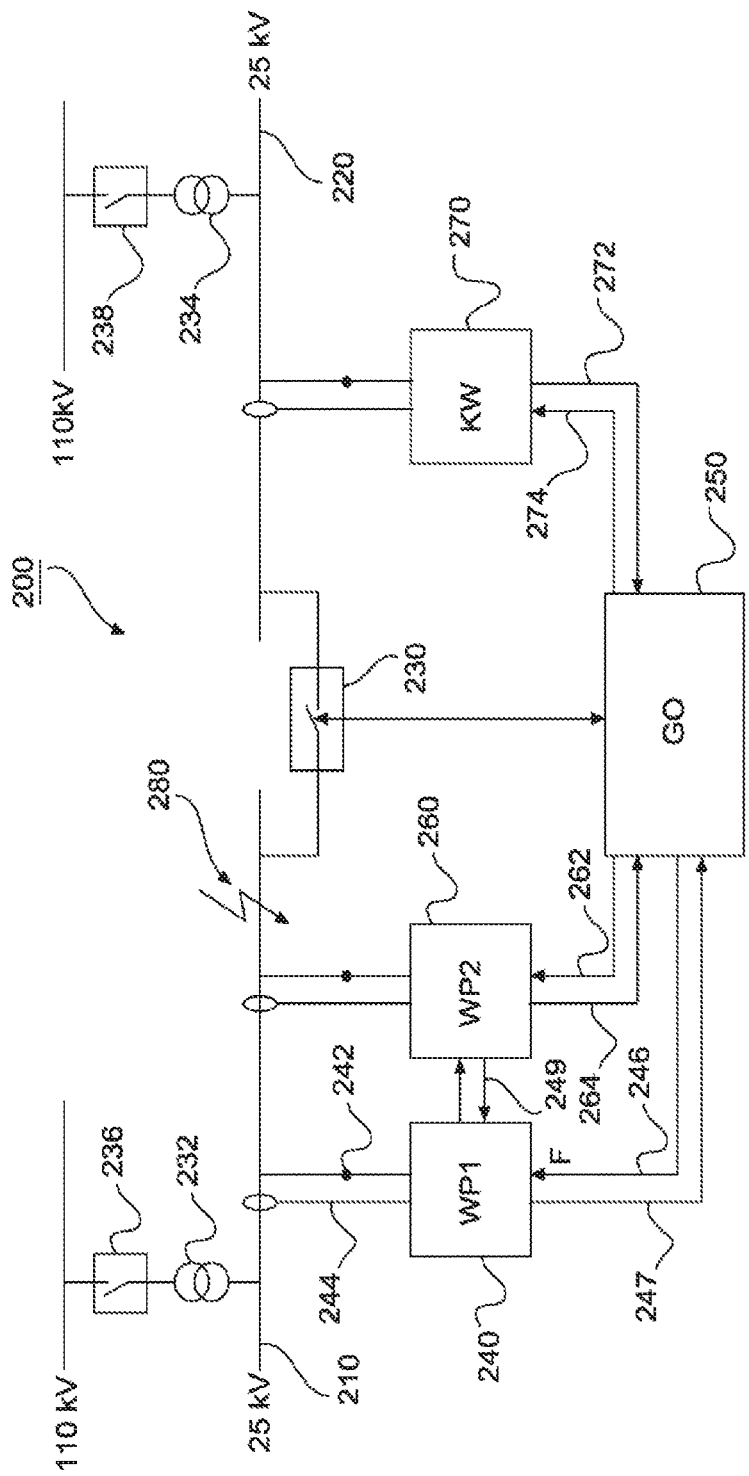
FIG. 2 schematically shows a structure of an electric supply grid.

FIG. 2 schematically shows a structure of an electric three-phase supply grid 200.

The electric supply grid 200 has a first grid section 210 and a further grid section 220 each having a grid nominal voltage of 25 kV. The first grid section 210 and the further grid section 220 are coupled to one another via a switching device 230 in order to transmit electric energy between the sections. The switching device 230 is also set up to disconnect the first grid section 210 from the further grid section 220 in the event of a fault.

The first grid section 210 and the further grid section 220 are also coupled, via transformers 232, 234 and further switching devices 236, 238, to other grid sections having a grid nominal voltage of 110 kV, for example.

The at least one wind power installation 240 which is preferably in the form of a wind farm WP1 is connected to the first grid section 210 and therefore to the electric supply grid 200 via the grid connection point 242. The at least one wind power installation 240 also has means for capturing 244 a status of the first grid section 210, in particular for capturing the grid voltage of the first grid section 210.

The at least one wind power installation 240 is also connected to the grid operator 250 via communication apparatuses 246, 247 which are illustrated here as data lines, in particular in order to capture a fault and obtain desired values. In this case, the data lines are in the form of ripple control signals, for example, and the data are transmitted via power line communication or optical fibers. The communication apparatuses 246, 247 can also be used to transmit further data, for example a weather forecast comprising a wind speed and a wind direction, or a guaranteed minimum power of the at least one wind power installation. The communication apparatuses 246, 247 are preferably wireless, for example using radio or WLAN.

The at least one wind power installation 210 is also connected to other wind power installations 260, in particular other wind farms WP2, via further communication apparatuses 248, 249. These other wind power installations can then likewise be connected to the grid operator via communication devices 264, 266 in order to interchange data.

The grid operator is also connected to further electric producers 270 in order to control the latter. This is illustrated, by way of example, by means of the power plant 270 which is connected to the grid operator via communication apparatuses 272, 274, wherein the power plant 270 is connected to the further grid section 220.

If a fault 280, for example, now occurs in the first grid section 210, the switching device 230 is triggered and disconnects the first grid section from the further grid section 220. The first grid section then becomes voltage-free, that is to say it has a grid voltage of 0 kV. The grid operator then reports a fault F to the at least one wind power installation 240, whereupon the latter changes from a normal operating mode to the observation mode. Furthermore, the grid operator 250 will now eliminate the disruption 280 and, by means of a schedule, will provide the first grid section with a grid rebuilding voltage which is, for example, greater than 70% of the grid nominal voltage of the first grid section. The grid rebuilding voltage is therefore not provided by the at least one wind power installation 240, but rather is only supported by the latter.

Figure 3:
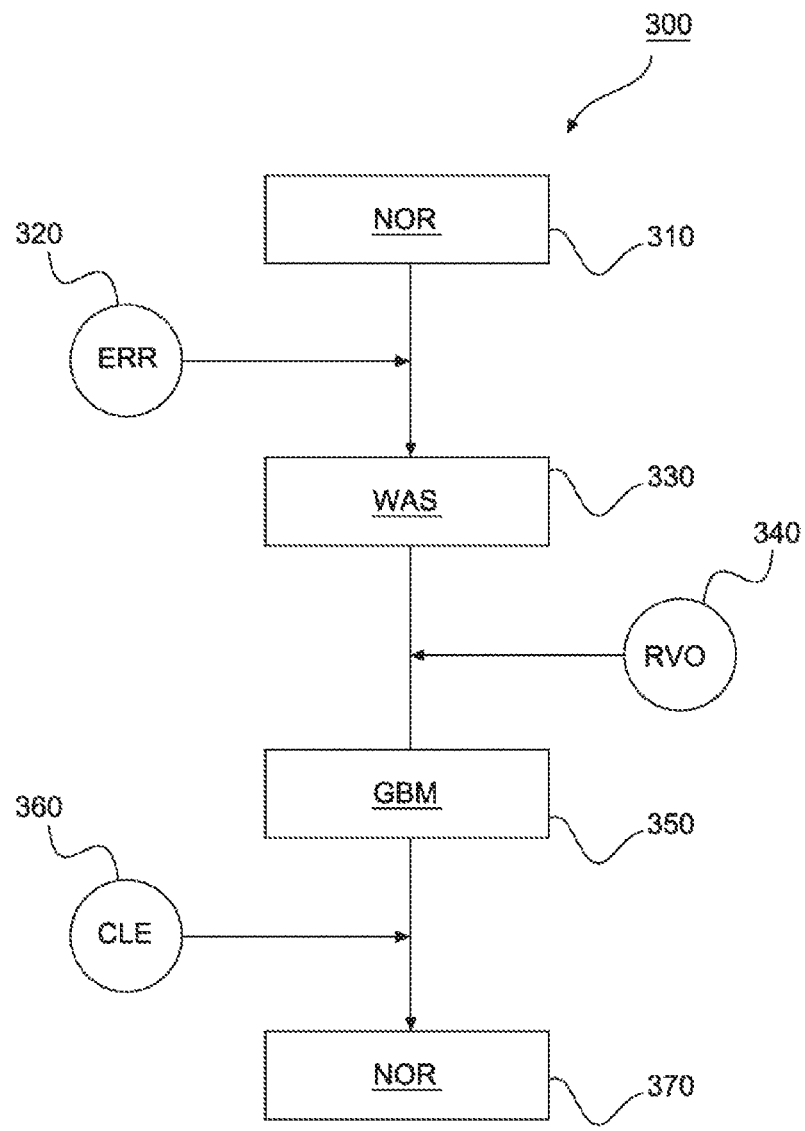
FIG. 3 schematically shows a method sequence of the method.

FIG. 3 schematically shows a method sequence of the method 300.

The wind power installation is first of all operated in a normal operating mode, that is to say it feeds electric active power and/or electric reactive power into a first grid section of the electric supply grid, which grid section has a grid frequency. In this case, the electric active and/or reactive power is fed in on the basis of a prevailing wind and/or on the basis of the grid frequency. This is indicated by the NOR block 310.

If a fault, in particular a voltage drop, now occurs in the first grid section, as a result of which the grid section no longer has a grid voltage, the switching devices of the electric supply grid disconnect the first grid section from the further grid sections. A fault is therefore present and is captured by the at least one wind power installation. This is indicated by the ERR block 320.

On account of the fault, the wind power installation changes from the normal operating mode to the observation mode. In the observation mode, the wind power installation no longer feeds in any electric power, but observes the status of the grid section by means of voltage capture. This is indicated by the WAS block 330.

The grid operator now initiates a schedule in order to rebuild the grid section, in particular to rebuild or restore the grid voltage. During this time, the wind power installation captures the grid voltage until the grid section has a grid rebuilding voltage. This is indicated by the RVO block 340.

If a grid rebuilding voltage is now captured by the wind power installation, the wind power installation changes from the observation mode to a grid rebuilding mode in which it supports the grid voltage on the basis of desired values. This is indicated by the GBM block 350.

The wind power installation is operated in the grid rebuilding mode until the grid operator reports that the fault has passed. This is indicated by the CLE block 360.

If the grid operator has now reported that the fault has passed, the wind power installation changes from the grid rebuilding mode to a normal operating mode or back to the normal operating mode. This is indicated by the second NOR block 370 which can correspond to the first NOR block 310.

Figure 4:
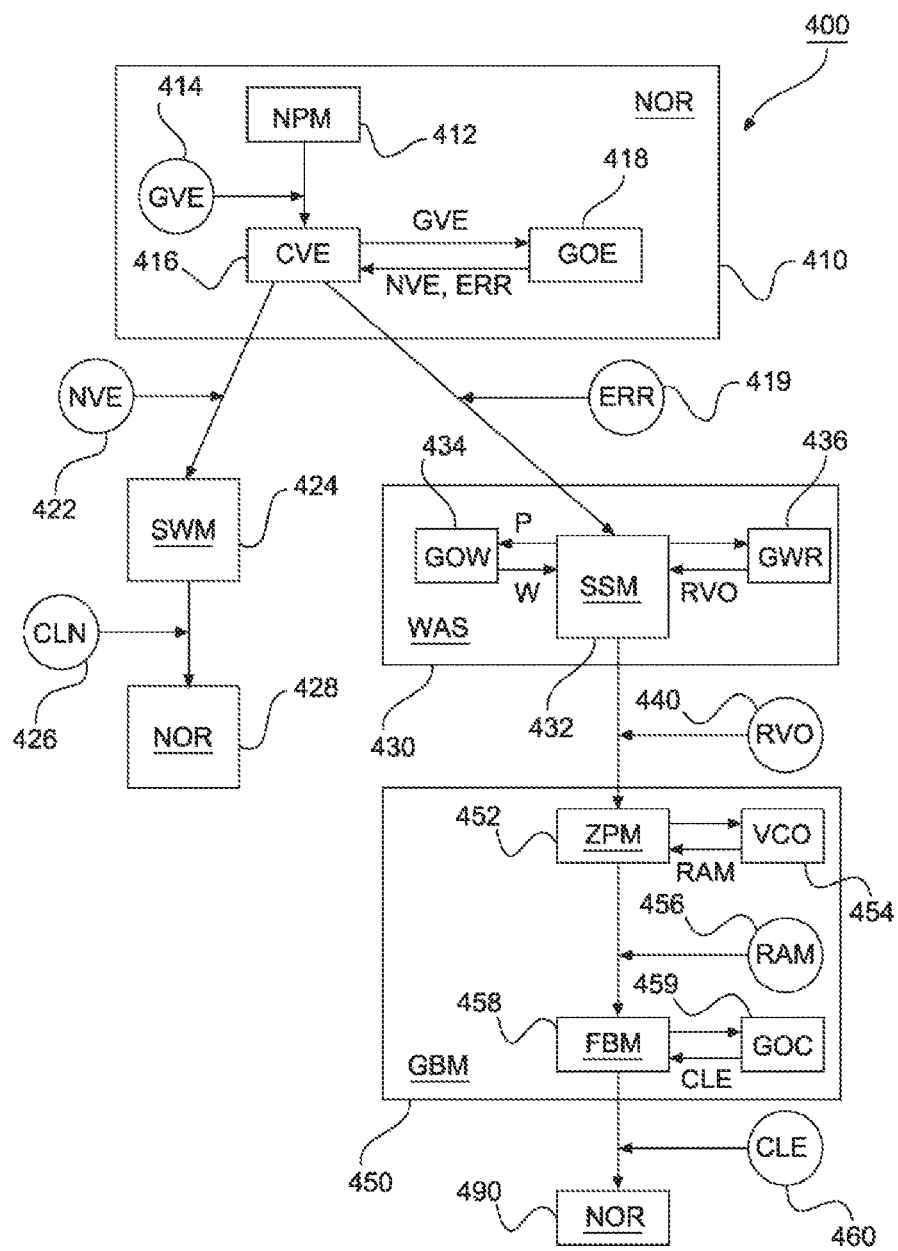
FIG. 4 schematically shows a method sequence of the method in a further embodiment.

FIG. 4 schematically shows a method sequence 400 of the method in one particularly preferred embodiment.

In this case, the method is subdivided substantially into the observation mode 430, the grid rebuilding mode 450 and the normal operating mode 490.

The at least one wind power installation or the wind farm is first of all operated normally or operated in a normal operating mode, that is to say it feeds in electric active power and/or electric reactive power into a first grid section of the electric supply grid, wherein the electric active and/or reactive power is fed in on the basis of a prevailing wind and/or on the basis of a grid frequency. The at least one wind power installation or the wind farm also monitors the grid voltage of the first grid section in the normal operating mode. This is indicated by the NOR block 410.

The NPM block 412 indicates the fact that the at least one wind power installation or the wind farm feeds electric active and/or electric reactive power into the first grid section in the normal operating mode on the basis of a prevailing wind and/or on the basis of a grid frequency.

If the at least one wind power installation or the wind farm now identifies a disruption, which is indicated by the GVE block 414, the at least one wind power installation or the wind farm checks this disruption for its type. This is indicated by the CVE block 416.

In this case, the disruption is checked, in particular, by comparing disruption data and/or directly with the grid operator and/or with other producers which are likewise connected to the first grid section. This procedure is indicated by the GOE block 418. The comparison determines, in particular, whether there is a normal disruption NVE or a fault ERR in the first grid section.

If there is now a normal disruption, that is to say, for example, a short-term frequency fluctuation, which is indicated by the NVE block 422, the at least one wind power installation or the wind farm changes to a grid support mode. This is indicated by the SWM block 442.

The at least one wind power installation or the wind farm maintains this grid support mode until the frequency fluctuation has passed. CLN block 426 indicates that the frequency fluctuation has passed. Whether the frequency fluctuation has passed can be captured either by the at least one wind power installation or the wind farm itself or can be requested from the grid operator.

If the frequency fluctuation has passed, the at least one wind power installation or the wind farm changes back to the normal operating mode again. This is indicated by the NOR block 428.

However, if there is now a fault, which is indicated by the ERR block 419, the at least one wind power installation or the wind farm changes to an observation mode which is indicated by the WAS block 430.

In the observation mode, the at least one wind power installation or the wind farm does not feed any electric power into the electric supply grid. This is indicated by the SSM block 432. The at least one wind power installation preferably also generates as much electric power as it requires for its personal needs in the observation mode.

In the observation mode, the at least one wind power installation or the wind farm also continuously creates weather forecasts W or requests them from the grid operator or from another provider. On the basis of these weather forecasts, the at least one wind power installation or wind farm transmits a guaranteed minimum power P to the grid operator. However, the weather forecasts can also be received and/or transmitted via the installation operator and/or a central control room, wherein the central control room is responsible for managing or controlling a plurality of wind power installations at different installation sites. This is indicated by the GOW block 434. In the observation mode, the at least one wind power installation or the wind farm simultaneously checks the status of the first grid section, in particular with respect to whether there is a grid rebuilding voltage RVO in the first grid section. This is indicated by the GWR block 436.

If there is a grid rebuilding voltage, which is indicated by the RVO block 440, the at least one wind power installation or the wind farm changes to the grid rebuilding mode, which is indicated by the GBM block 450.

In the grid rebuilding mode, the at least one wind power installation or the wind farms synchronizes with the grid rebuilding voltage of the first grid section without initially feeding electric power into the first grid section in this case. The wind power installation is preferably operated in this case at a speed which is above a speed which is usually used for the prevailing wind speed and which can often be determined on the basis of a speed/power characteristic curve. The wind power installation or the wind power installations in the wind farm therefore has/have an overspeed in the grid rebuilding mode. This is indicated by the ZPM block 452. The at least one wind power installation or the wind farm additionally requests or receives desired values for the grid rebuilding which can therefore be specified, wherein these desired values have been determined by the grid operator on the basis of the guaranteed minimum power. This is indicated by the VCO block 454.

As a result of a ramp specification by the grid operator, which is indicated by the RAM block 456, the wind power installation begins to slowly and continuously increase the power which is fed in, in particular the active power which is fed in. The at least one wind power installation or the wind farm is therefore involved in frequency stabilization of a frequency of the first grid section during the grid rebuilding mode. This is indicated by the FBM block 458.

During the frequency stabilization, which is indicated by the FBM block 458, the at least one wind power installation or the wind farm continues to communicate with the grid operator, in particular in order to request the status of the first grid section. This is indicated by the GOC block 459.

If the grid operator now reports that the fault has passed, which is indicated by the CLE block 460, the at least one wind power installation or the wind farm changes back to the normal operating mode again. This is indicated by the NOR block 490. Grid rebuilding is therefore then concluded.

The invention claimed is:

1. A method for rebuilding an electric supply grid by at least one wind farm, wherein the electric supply grid includes a first grid section and a second grid section having the same nominal grid voltages, wherein:

the first grid section is coupled to the at least one wind farm and has a first grid nominal voltage, the first and second grid sections power the electric supply grid independently of each other, the first grid section is coupled to the second grid section via at least one switching device in order to transmit electric energy between the first and second grid sections, and the at least one switching device is configured to disconnect the first grid section from the second grid section in an event of a fault to cease the transmission of the electric energy between the first and second grid sections, wherein the first grid section and the second grid section are at a high voltage between 10 and 400 kilovolts (kV), the method comprising:

operating the at least one wind farm in an observation mode if the fault occurs, wherein the at least one wind farm does not feed into the first grid section in the observation mode and a status of the first grid section is checked;

operating the at least one wind farm in a grid rebuilding mode if the first grid section has a grid rebuilding voltage and feeding electric reactive power into the first grid section to stabilize a grid voltage of the first grid section; and operating the at least one wind farm in a normal operating mode after the fault has passed.

2. The method for rebuilding the electric supply grid as claimed in claim 1, wherein the fault occurs in response to at least one of:

a voltage drop in the first grid section;

an overfrequency in the first grid section; and an underfrequency in the first grid section.

3. The method for rebuilding the electric supply grid as claimed in claim 1, wherein the fault is determined by at least one of:

a message from a grid operator; or capturing the grid voltage of the first grid section, wherein the captured grid voltage is less than 90% of the first grid nominal voltage.

4. The method for rebuilding the electric supply grid as claimed in claim 1, comprising determining the fault has passed by at least one of:

a message from a grid operator;

capturing the grid voltage of the first grid section, wherein the captured grid voltage is greater than 70% of the first grid nominal voltage for a predetermined minimum period of time;

capturing a frequency stability, wherein the frequency stability is present if a grid frequency is within a tolerance band for a predetermined period of time, wherein the tolerance band has an upper limit and a lower limit wherein the upper limit is above a grid nominal frequency and the lower limit is below the grid nominal frequency; or a grid detection unit configured to excite the electric supply grid and to observe the first grid section in order to determine a size of the first grid section.

5. The method for rebuilding the electric supply grid as claimed in claim 1, wherein the grid rebuilding mode comprises synchronization operation in which the at least one wind farm is synchronized with the grid voltage of the first grid section, when the grid voltage is substantially stable.

6. The method for rebuilding the electric supply grid as claimed in claim 1, wherein the grid rebuilding mode comprises a power control process during which the at least one wind farm feeds an electric power into the first grid section based on a desired power value, wherein the desired power value is specified by a grid operator and increases the electric power in such a manner that the electric power is tracked in the case of a remaining system deviation.

7. The method for rebuilding the electric supply grid as claimed in claim 6, wherein the power control process has a frequency stabilization process configured to:
retain some of the electric power for feeding into the first grid section to stabilize a frequency of the first grid section; and
limit feeding-in of the electric power if the first grid section has a grid frequency which is an overfrequency.

8. The method for rebuilding the electric supply grid as claimed in claim 1, further comprising operating the at least one wind farm such that the at least one wind farm retains a predetermined portion of its nominal power as controlling power.

9. The method for rebuilding the electric supply grid as claimed in claim 1, further comprising:
capturing a weather forecast for the grid rebuilding mode for determining a minimum power of the at least one wind farm, wherein the weather forecast:
is determined by the at least one wind farm; or
is requested by the at least one wind farm from a grid operator.

10. The method for rebuilding the electric supply grid as claimed in claim 9, further comprising:
determining the minimum power of the at least one wind farm based on the weather forecast.

11. The method for rebuilding the electric supply grid as claimed in claim 9, further comprising:
transferring a value indicative of the minimum power of the at least one wind farm to the grid operator based on the weather forecast.

12. The method for rebuilding the electric supply grid as claimed in claim 1, further comprising:
providing the first grid section with a voltage synchronized with the grid voltage by the at least one wind farm.

13. The method for rebuilding the electric supply grid as claimed in claim 12, wherein the first grid section is provided with the voltage using a voltage stabilization process performed based on a desired voltage specification to provide the first grid section with a substantially stable voltage.

14. A method for rebuilding the electric supply grid by means of the at least one wind farm comprising a plurality of wind power installations, wherein the plurality of wind power installations are configured to carry out the method as claimed in claim 1, wherein the at least one wind farm has at least a nominal power of between 4 megawatts (MW) and 400 MW and is coupled to the first grid section.

15. The at least one wind farm as claimed in claim 14, comprising:
a transformer having a primary side and a secondary side, wherein the transformer is set up to connect the at least one wind farm to the first grid section.

16. A wind power installation comprising a controller for controlling the wind power installation, wherein the controller is configured to carry out the method as claimed in claim 1.

17. The method for rebuilding the electric supply grid as claimed in claim 4, wherein the captured grid voltage is greater than 90% of the first grid nominal voltage for the predetermined minimum period of time.

18. The method for rebuilding the electric supply grid as claimed in claim 4, wherein the upper limit is 51 hertz (Hz), the lower limit is 49 Hz and the grid nominal frequency is 50 Hz.

19. The method for rebuilding the electric supply grid as claimed in claim 8, further comprising at least one of:
feeding the predetermined portion into the first grid section; or
making the predetermined portion available to a grid operator for control measures.

20. The method for rebuilding the electric supply grid as claimed in claim 12, wherein providing the first grid section with the voltage synchronized with the grid voltage by the at least one wind farm is based on at least one of: a weather forecast or a desired voltage specification of a grid operator.

21. The method for rebuilding the electric supply grid as claimed in claim 13, wherein the voltage stabilization process includes feeding in the electric reactive power.

* * * * *